(12) United States Patent
Andrieu et al.

(10) Patent No.: US 7,085,439 B2
(45) Date of Patent: Aug. 1, 2006

(54) TUNABLE FILTER CONSISTING OF AN OPTICAL FIBER, AND A CORRESPONDING METHOD

(75) Inventors: Xavier Andrieu, Bretigny sur Orge (FR); Denis Cottevieille, Montreuil sous Bois (FR); Isabelle Riant, Orsay (FR)

(73) Assignee: Avanex Corporation, Fremont, CA (US)

( * ) Notice: Subject to any disclaimer, the term of this patent is extended or adjusted under 35 U.S.C. 154(b) by 297 days.

(21) Appl. No.: 10/254,656

(22) Filed: Sep. 26, 2002

(65) Prior Publication Data
US 2003/0059149 A1   Mar. 27, 2003

(30) Foreign Application Priority Data
Sep. 27, 2001   (FR) .................................. 01 12449

(51) Int. Cl.
*G06F 385/10* (2006.01)
(52) U.S. Cl. ........................................ 385/10
(58) Field of Classification Search ................ 385/10, 385/1–4, 8, 37
See application file for complete search history.

(56) References Cited

U.S. PATENT DOCUMENTS

| | | | | |
|---|---|---|---|---|
| 4,915,467 A | * | 4/1990 | Berkey | 385/43 |
| 5,007,705 A | * | 4/1991 | Morey et al. | 385/12 |
| 5,745,626 A | * | 4/1998 | Duck et al. | 385/96 |
| 5,912,910 A | * | 6/1999 | Sanders et al. | 372/22 |
| 5,995,697 A | | 11/1999 | Byron et al. | |
| 6,256,428 B1 | | 7/2001 | Norwood et al. | |
| 6,278,811 B1 | | 8/2001 | Hay et al. | |
| 6,792,009 B1 | * | 9/2004 | Putnam et al. | 372/6 |

FOREIGN PATENT DOCUMENTS

| | | |
|---|---|---|
| EP | 0 989 426 A1 | 3/2000 |
| EP | 1 063 546 A1 | 12/2000 |
| WO | WO 00/39617 A2 | 7/2000 |
| WO | WO 00/70379 A1 | 11/2000 |

OTHER PUBLICATIONS

B. Kondratowicz et al, "An Investigation into the use of electrochromic polymers in optical fibre gas sensors", Sensors and Actuators B, Elsevier Sequoia S.A., vol. 74, No. 1-3, Apr. 15, 2001, pp. 138-144, XP004233668.

Cruz J L et al.: "Improved thermal sensitivity of fibre Bragg gratings using a polymer overlayer" Electronics Letters, IEE Stevenage, GB, vol. 32, No. 4, Feb. 15, 1996, pp. 385-387, XP006004767.

* cited by examiner

*Primary Examiner*—Daniel Stcyr
(74) *Attorney, Agent, or Firm*—Patterson & Sheridan, LLP

(57) ABSTRACT

The invention concerns a tunable filter comprising an optical fiber incorporating a Bragg grating on a portion of the fiber. Said fiber portion is coated with a material retained within a confined space and adapted to exert pressure on said Bragg grating to compress said portion of fiber radially and to stretch it longitudinally.

6 Claims, 1 Drawing Sheet

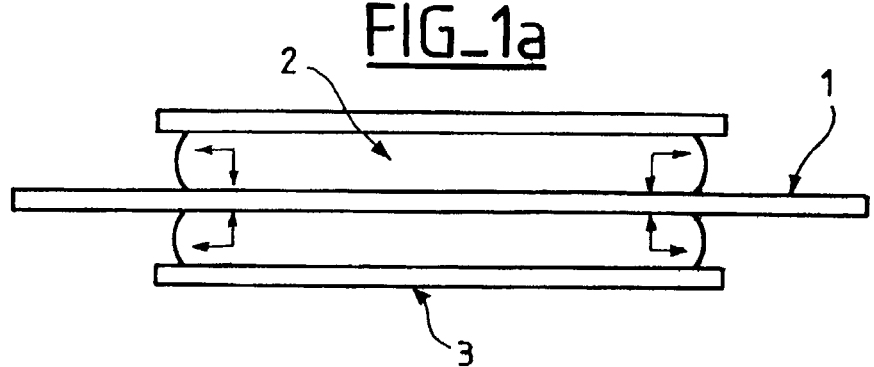
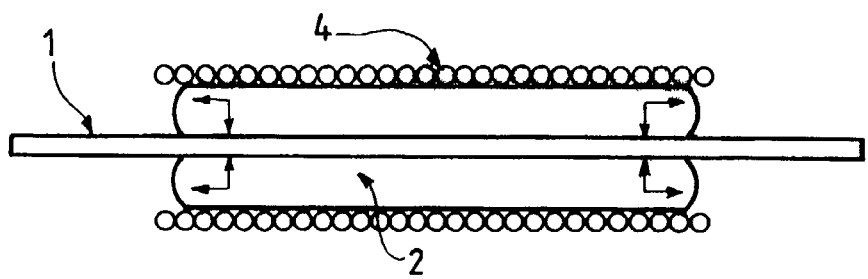
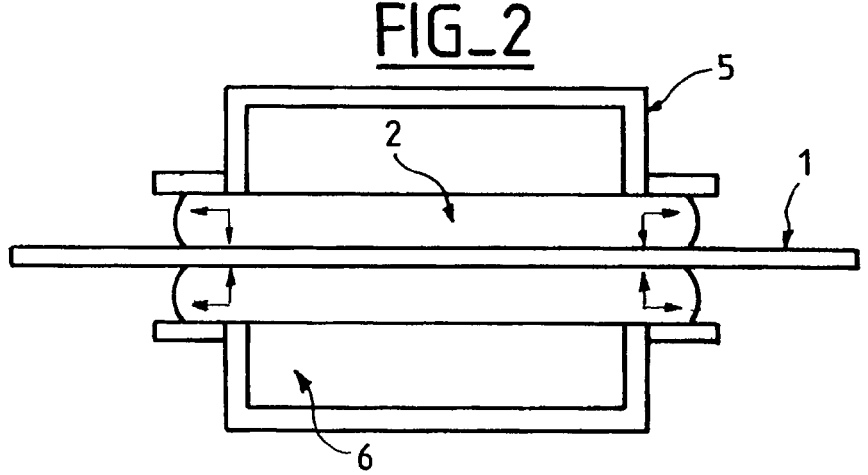
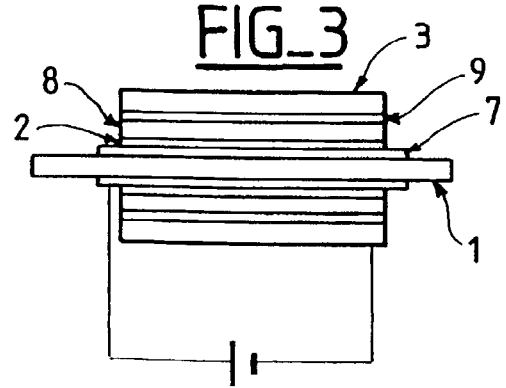

TUNABLE FILTER CONSISTING OF AN OPTICAL FIBER, AND A CORRESPONDING METHOD

The invention relates to a wavelength tunable filter and the corresponding method of use.

The field of the invention is that of optical telecommunication systems, more specifically that of tunable filters used in wavelength division multiplexing or demultiplexing systems, for example.

BACKGROUND OF THE INVENTION

Tunable filters can consist of Bragg gratings photo-induced onto portions of waveguides such as optical fibers or planar waveguides. This kind of filter constitutes a component integrated into an optical guide and considerably reduces insertion losses and polarization-dependent losses.

An optical fiber conventionally comprises an optical core, whose function is to transmit and possibly to amplify an optical signal, surrounded by optical cladding, whose function is to confine the optical signal in the core. To this end, the refractive index $n_{core}$ of the core is greater than the refractive index $n_{cladding}$ of the cladding. Thus the core and the cladding form a waveguide. The cladding is itself surrounded by an external medium whose refractive index $n_{ext}$ is greater than or less than $n_{cladding}$. The core-cladding combination associated with the external medium again forms a waveguide.

To write the Bragg grating, the core and/or the cladding of the fiber can be doped to render it or them photosensitive, for example with germanium (Ge).

A Bragg grating conventionally consists of a local periodic variation in the refractive index of the guide. The pitch of the grating, i.e. the distance between two index variations in the guide, can be constant, varying or multiple. In the case of a grating with a constant pitch Λ, the periodic variation of the refractive index distributed along the optical transmission axis in a portion of the guide creates a mirror which is reflective for a given wavelength known as the Bragg wavelength (the filtered wavelength), in accordance with the following equation, in which $n_{eff}$ is the effective index of the fundamental mode in the core of the guide:

$$\lambda_B = 2.\Lambda.n_{eff}$$

One technique for varying the pitch of the grating, and thus the filtered wavelength, is to stretch the fiber.

The stretching can be mechanical and consist, for example, in pulling on each end of the fiber. This kind of stretching is complicated to carry out and to monitor.

OBJECT AND SUMMARY OF THE INVENTION

The object of the present invention is to propose a tunable filter consisting of an optical fiber which incorporates a Bragg grating and can be stretched easily.

The invention provides a tunable filter comprising an optical fiber incorporating a Bragg grating on a portion of said fiber, which filter is primarily characterized in that said portion of fiber is coated with a material retained within a confined space and adapted to exert pressure on said Bragg grating to compress said portion of fiber radially and to stretch it longitudinally.

In the above kind of filter the fiber may be stretched by transforming a variation in pressure on the fiber into longitudinal extension thereof by means of a deformable elastic material.

In a first embodiment of the invention, said pressure is induced by heating the material, which expands in said confined space.

Said confined space may be defined by a capillary tube which expands relatively little due to the effect of heat or by turns which expand relatively little due to the effect of heat.

In a second embodiment of the invention, said pressure is induced by external radial mechanical forces applied to the surface of the material retained in said confined space.

Said confined space may be defined by a container surrounding said portion of fiber and filled with a non-compressible element adapted to induce said radial forces due to the effect of pressure exerted on said non-compressible element.

Said non-compressible element may be a non-compressible fluid or a thermally expandable material.

The material exerting the pressure on the fiber portion with the Bragg grating may be a cross-linked elastomer polymer, for example of the silicone type.

In a third embodiment said pressure is induced by oxidation-reduction of the material, which expands in said confined space.

According to one feature of the third embodiment the material is an electrochemical material selected from the group comprising conductive polymers, inorganic insertion compounds, intercalation graphite compounds, and Fullerene type compounds.

In one variant of the third embodiment the material is disposed between a first electrode and a second electrode and is associated with an electrolyte, such as gel which conducts ions.

The invention also provides a method of stretching an optical fiber having a Bragg grating on a portion of said fiber, characterized in that it consists in exerting pressure on said grating by means of a material retained within a confined space around said fiber portion to stretch said material longitudinally and thereby stretch said fiber portion longitudinally.

In one implementation said pressure is exerted by expansion of said material.

In different implementations, the expansion of said material is induced by heating or by an oxidation-reduction cycle.

In another implementation of the invention, said pressure is exerted by radial mechanical forces applied to the surface of said polymer material.

BRIEF DESCRIPTION OF THE DRAWING

Other features and advantages of the invention will become clearly apparent on reading the description given by way of non-limiting example and with reference to the accompanying drawing, in which:

FIGS. 1a and 1b show diagrammatically two variants of a first embodiment of an optical filter of the invention in which a polymer material is inserted into a capillary tube (FIG. 1a) or surrounded by turns forming a binding (FIG. 1b);

FIG. 2 shows diagrammatically a second embodiment of an optical filter of the invention in which a polymer material is enclosed in a container; and FIG. 3 shows diagrammatically a third embodiment of an optical filter of the invention in which a polymer material undergoes an oxidation-reduction cycle.

MORE DETAILED DESCRIPTION

As shown in all the figures, the tunable filter of the invention consists of a Bragg grating photo-induced in a portion of an optical fiber 1 coated with a material 2 retained in a confined space by a tube 3, a binding 4, a container 5, etc.

The material 2 is adapted to exert pressure on the portion of fiber 1. The material 2 is stretched in the direction of the axis of the fiber and entrains said portion of the fiber with it and thereby stretches it. To ensure that the portion of fiber 1 does indeed stretch with the material 2, the material must not become detached from the fiber during stretching since it would then slide on the fiber without entraining it, which is why the material is confined in a space around the fiber so that it is pressed against the fiber when it stretches.

The stretching is of course reversible so that the fiber returns to its original size and, more generally, its originally characteristics. Nevertheless, the filter need not recover its original characteristics in full. However, since the tunable filter is integrated in an electronic device including an electronic control system, the system can compensate any drift.

For simplicity, the portion of the fiber incorporating a Bragg grating is referred to hereinafter as the fiber.

In a first embodiment of the invention, shown in FIG. 1a), a material 2, for example a polymer, is inserted into a capillary tube 3 made of a material that does not expand much or at all under the influence of heat. The tube 3 can be made of a ferrous alloy such as the Invar alloy from Aciéries d'IMPHY, for example.

The material 2 is heated via the capillary tube 3 and expands, increasing in volume due to the effect of the heat.

Being confined within the space defined by the capillary tube 3, the material 2 expands in the direction indicated by the arrows, i.e. towards the fiber 1, compressing it in the radial direction, i.e. being pressed even more strongly onto the fiber and, most importantly, stretching in the longitudinal direction of the fiber, which is the intended effect.

The expansion of the material 2, and thus the resulting thermal stretching, are controlled by varying the temperature.

The adhesion of the material 2 to the fiber 1 can be different from its adhesion to the capillary tube 3, in particular due to the effect of heat. The stretching of the material 2 in the longitudinal direction of the fiber is then not the same where it is in contact with the fiber 1 as where it is in contact with the tube 3; the stretching where it is in contact with the fiber 1 can in particular be retarded by excessive adhesion of the material 2 to the capillary tube 3.

A solution shown in FIG. 1b) consists in replacing the capillary tube with turns 4 made of the same ferrous alloy. These turns 4 form what is referred to herein as a binding.

The stretching of the material 2 is then no longer retarded where it is in contact with the turns 4, which can move slightly away from each other due to the effect of stretching, their diameter nevertheless remaining constant.

In a second embodiment shown in FIG. 2 a material 2, for example a polymer, is encircled by a hermetic container 5 filled with an incompressible element 6 directly in contact with the polymer material 2. The incompressible element 6 can be an incompressible liquid such as a silicone gel or oil or a thermally expandable material such as a polymer.

The material 2 constitutes a wall of the container 5, as it were. The other walls of the container 5 are sufficiently rigid for pressure exerted on the liquid or material 6 in the container 5 to induce external radial mechanical forces uniformly over the surface of the material 2 in contact with the element 6.

The container 5 can be made from a material such as Kovar or the above-specified Invar alloy.

Because the volume of the material 2 remains constant, the pressure transmitted to said material 2, which is confined within the space defined by the container 5, has the effect of flattening it, both by pressing it even more strongly onto the fiber 1 due to the effect of a radial force and by stretching it longitudinally, i.e. in the longitudinal direction of the fiber 1.

The pressure in the container and thus the resulting mechanical stretching are controlled by actuators, for example a piston or an electromagnetic, piezo-electric or thermal device.

In the two embodiments described above, the material 2 is preferably a polymer having very good adhesion to the fiber. A polymer is a very good intermediary for transmitting a movement or a force. A silicone polymer is suitable for a silica fiber.

The polymer material is preferably a cross-linked elastomer, because a cross-linked elastomer has the particular feature of deforming due to the effect of a stress and of resuming its original shape when the stress is removed.

In a third embodiment shown in FIG. 3 an electrochemical material 2 is disposed in a tube 3 defining a confined space in the sense that is relevant to the invention.

The electrochemical material 2 is then subjected to an oxidation-reduction cycle. Due to the effect of an electrical potential, the material 2 expands and increases in volume, leading to elongation of the fiber in the manner described above with reference to the first embodiment employing heating.

For this third embodiment, the electrochemical material 2 is chosen from the group comprising conductive polymers, inorganic insertion compounds, intercalation graphite compounds, and Fullerene type compounds.

The properties of conductive polymers are described in "Muscles artificiels á base de nouveaux polymers conducteurs électroniques" [Artificial muscles based on novel electronically conductive polymers] by S. Sadki, C. Bohn, A. B. Brennan and J. R. Reynolds in the abstract of a communication to the 2001 Journées Polymers Conducteurs. When a conductive polymer associated with an electrolyte is subjected to an electrical potential, a doping/dedoping phenomenon induces a change in the volume of said polymer material. These polymers are used in the biomedical field for artificial muscle applications.

Inorganic insertion compounds are based on transition metal oxide compositions and ionic compounds such as the lithium salt. When this kind of material associated with an electrolyte is subjected to an electrical potential, an insertion/de-insertion phenomenon induces a change of volume of said material. These materials are routinely used in batteries.

Intercalation graphite compounds, graphite oxides, and Fullerene type compounds are equally suitable for implementing the third embodiment. A change in the volume of a material of this kind is also observed when said material is associated with electrolytes and subjected to an electrical potential.

The electrochemical material 2 is disposed on the fiber 1 on top of a metal layer constituting a first electrode 7, for example a layer of gold. Said material 2 is confined in a metal tube 3 whose inside wall is plated with the same metal as the first electrode to constitute a second electrode 9. The tube 3 further contains a suitable electrolyte 8, such as an ionically conductive material 8, for example a gel.

An electrical potential is then applied between the electrodes 7 and 9 and causes electrolysis of the electrochemical material 2, which expands and exerts pressure on the fiber 1. A control loop monitors the stretching of the fiber 1 due to the expansion of the material 2.

There follow a few estimates.

The length of the portion of fiber incorporating the Bragg grating is typically a few tens of millimeters; it can be from 50 µm to several meters, however. Wavelength tunability can be used to tune the filter to one or other transmission channel as a function of the wavelength to be transmitted or to tune the filter to one channel or between two channels to render the device into which it is integrated conducting or non-conducting. The interchannel spacing is typically 100, 50 or even 25 GHz, which corresponds to a wavelength spacing of 0.8, 0.4 or 0.2 nm.

For a silica fiber diameter of approximately 125 µm, the thickness of the polymer material coated onto the fiber lies in the range 60 µm to 5 mm.

Stretching is limited by the mechanical strength of the fiber. An acceptable limit value is of the order of 0.5% if the fiber is made of silica. For a wavelength shift of 0.8 nm, the stretching is approximately 0.1%. In the case of thermal stretching, the polymer material is heated to a temperature of about 80° C.

What is claimed is:

1. A tunable filter comprising an optical fiber incorporating a Bragg grating on a portion of said fiber, characterized in that said portion of fiber is coated with a material retained within a confined space and adapted to exert pressure on said Bragg grating to compress said portion of fiber radially and to stretch said portion of fiber longitudinally, wherein:
   said pressure is induced by oxidation-reduction of the material which expands in said confined space; and
   said material is disposed between a first electrode and a second electrode and is associated with an electrolyte.

2. The tunable filter according to claim 1, characterized in that the material is an electrochemical material selected from the group comprising conductive polymers, inorganic insertion compounds, intercalation graphite compounds, and Fullerene compounds.

3. The tunable filter according to claim 1, characterized in that the electrolyte is an ionically conductive gel.

4. A tunable filter comprising an optical fiber incorporating a Bragg grating on a portion of said fiber, characterized in that said portion of fiber is coated with a material retained within a confined space and adapted to exert pressure on said Bragg grating to compress said portion of fiber radially and to stretch said portion of fiber longitudinally, wherein said material is disposed between a first electrode and a second electrode and is associated with an electrolyte.

5. The tunable filter according to claim 4, characterized in that the material is an electrochemical material selected from the group comprising conductive polymers, inorganic insertion compounds, intercalation graphite compounds, and Fullerene compounds.

6. The tunable filter according to claim 4, characterized in that the electrolyte is an ionically conductive gel.

\* \* \* \* \*